United States Patent
Fan et al.

(10) Patent No.: US 10,345,673 B2
(45) Date of Patent: Jul. 9, 2019

(54) BIAS CONTROL APPARATUS AND METHOD OF MODULATOR OF OPTICAL TRANSMITTER AND OPTICAL TRANSMITTER

(71) Applicant: FUJITSU LIMITED, Kawasaki-shi, Kanagawa (JP)

(72) Inventors: Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/952,721

(22) Filed: Apr. 13, 2018

(65) Prior Publication Data

US 2018/0314127 A1 Nov. 1, 2018

(30) Foreign Application Priority Data

Apr. 26, 2017 (CN) .......................... 2017 1 0284631

(51) Int. Cl.
*H04B 10/04* (2006.01)
*G02F 1/21* (2006.01)
(Continued)

(52) U.S. Cl.
CPC .............. *G02F 1/21* (2013.01); *G02F 1/0123* (2013.01); *G02F 1/225* (2013.01); *H04B 10/541* (2013.01);
(Continued)

(58) Field of Classification Search
CPC .. G02F 2203/50; G02F 2001/212; G02F 1/21; G02F 1/0123; G02F 1/225; H04B 10/541; H04B 10/564
(Continued)

(56) References Cited

U.S. PATENT DOCUMENTS

2008/0080872 A1 4/2008 Tanaka et al.
2014/0010530 A1* 1/2014 Goebuchi .......... H04B 10/5057
398/25
(Continued)

FOREIGN PATENT DOCUMENTS

| CN | 103532633 A | 1/2014 |
| CN | 103873152 A | 6/2014 |
| CN | 104662822 A | 5/2015 |

OTHER PUBLICATIONS

"Performance Analysis of Feedback Control for Multiple Bias Voltages in 16-QAM Optical Transmittal Based on IQ Optical Modulation"; Cao Jianchao et al.; Harbin Institute of Technology Shenzhen Graduate School, Shenzhen, Guangdong 518055, China; (7 pages).

*Primary Examiner* — Mohammad R Sedighian
(74) *Attorney, Agent, or Firm* — Staas & Halsey LLP

(57) ABSTRACT

Embodiments of this disclosure provide a bias control apparatus and method of a modulator of an optical transmitter and an optical transmitter. By obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

8 Claims, 5 Drawing Sheets

(51) Int. Cl.
　　　*H04B 10/54*　　　(2013.01)
　　　*H04B 10/564*　　(2013.01)
　　　*G02F 1/01*　　　　(2006.01)
　　　*G02F 1/225*　　　(2006.01)

(52) U.S. Cl.
　　　CPC ..... *H04B 10/564* (2013.01); *G02F 2001/212* (2013.01); *G02F 2203/50* (2013.01)

(58) Field of Classification Search
　　　USPC .......................................................... 398/186
　　　See application file for complete search history.

(56) References Cited

U.S. PATENT DOCUMENTS

| | | |
|---|---|---|
| 2014/0010533 A1 | 1/2014 | Yan et al. |
| 2014/0023368 A1 | 1/2014 | Bhandare et al. |
| 2014/0168741 A1 | 6/2014 | Li et al. |

\* cited by examiner

BIAS CONTROL APPARATUS AND METHOD OF MODULATOR OF OPTICAL TRANSMITTER AND OPTICAL TRANSMITTER

CROSS-REFERENCE TO RELATED APPLICATIONS

This application claims the benefit of Chinese Patent Application No. 201710284631.4, filed Apr. 26, 2017, in the State Intellectual Property Office of China, the disclosure of which is incorporated herein by reference.

BACKGROUND

1. Field

This disclosure relates to the field of communications technologies, and in particular to a bias control apparatus and method of a modulator of an optical transmitter and an optical transmitter.

2. Description of the Related Art

In a high-speed optical communications system, it is generally needed to provide a modulator in an optical transmitter to modulate transmitted signals; wherein, in-phase and quadrature (IQ) modulators are widely used in optical communications systems to generate transmitted signals of high spectral efficiencies.

FIG. 1 is a schematic diagram of existing bias control on a modulator of an optical transmitter. As shown by a dotted box in FIG. 1, a modulator 101 of the optical transmitter has two push-pull Mach-Zehnder modulators (MZMs), respectively referred to as a first Mach-Zehnder modulator 102 and a second Mach-Zehnder modulator 103, and a phase modulator (PM) 104, the first Mach-Zehnder modulator 102 and the second Mach-Zehnder modulator 103 being respectively used for modulating driving signals $v_{rf,I}$ and $v_{rf,Q}$ of an I path and a Q path, and the phase modulator 104 introducing a phase difference of 90° between the I path and the Q path. In a normal operating state, the two Mach-Zehnder modulators 102 and 103 and the phase modulator 104 are all biased at respective optimal operating points. However, due to such factors as changes of ambient temperatures, and aging of devices, etc., drifts may possibly occur in all three bias points (denoted by bias I, bias Q, and bias P) of the modulators. Hence, the three bias points may deviate from the optimal operating points.

In order to ensure modulation performance of the modulators, an automatic bias control (ABC) circuit is usually used to respectively track and adjust the three bias points. As shown in FIG. 1, a photoelectric detector 105 detects output power signals of the modulator 101 of the optical transmitter, and an automatic bias control circuit 106 controls bias voltages $V_I$, $V_Q$ and $V_P$ on the three bias points, bias I, bias Q, and bias P, of the modulators according to detecting results of the photoelectric detector 105; for example, a method in which pilot perturbation is applied on a bias voltage may be used currently.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by inventors that due to nonlinear modulation characteristics of a Mach-Zehnder modulator, a sensitivity of an existing automatic bias control circuit will be lowered as an increase of a driving signal. Furthermore, after the pilot perturbation and transmitted signals are transmitted together, the pilot perturbation is hard to be removed at a receiver end. And for an optical fiber communications system adopting high-order modulation formats, a performance (Q factor) cost produced by the automatic bias control circuit, especially a performance cost produced by an automatic bias control circuit used for controlling bias P, will be increased to an extent that is unacceptable.

Embodiments of this disclosure provide a bias control apparatus and method of a modulator of an optical transmitter and an optical transmitter, in which by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

According to a first aspect of the embodiments of this disclosure, there is provided a bias control apparatus of a modulator of an optical transmitter, the modulator of the optical transmitter including a first Mach-Zehnder modulator and a second Mach-Zehnder modulator, the apparatus including: an acquiring unit configured to obtain a first output power signal of the first Mach-Zehnder modulator, a second output power signal of the second Mach-Zehnder modulator and a third output power signal of the modulator of the optical transmitter; an extracting unit configured to extract information on a phase bias of the modulator of the optical transmitter according to the first output power signal, the second output power signal and the third output power signal; and a controlling unit configured to control the phase bias of the modulator of the optical transmitter according to the information on the phase bias of the modulator of the optical transmitter.

According to a second aspect of the embodiments of this disclosure, there is provided an optical transmitter, including the apparatus as described in the first aspect of the embodiments of this disclosure.

According to a third aspect of the embodiments of this disclosure, there is provided a bias control method of a modulator of an optical transmitter, the modulator of the optical transmitter including a first Mach-Zehnder modulator and a second Mach-Zehnder modulator, the method including: obtaining a first output power signal of the first Mach-Zehnder modulator, a second output power signal of the second Mach-Zehnder modulator and a third output power signal of the modulator of the optical transmitter; extracting information on a phase bias of the modulator of the optical transmitter according to the first output power signal, the second output power signal and the third output power signal; and controlling the phase bias of the modulator of the optical transmitter according to the information on the phase bias of the modulator of the optical transmitter.

An advantage of the embodiments of this disclosure exists in that by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and illustrate the preferred embodiments of the present invention, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the present disclosure will be apparent with reference to the following description and attached drawings. In the description and drawings, particular embodiments of the invention have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 2:
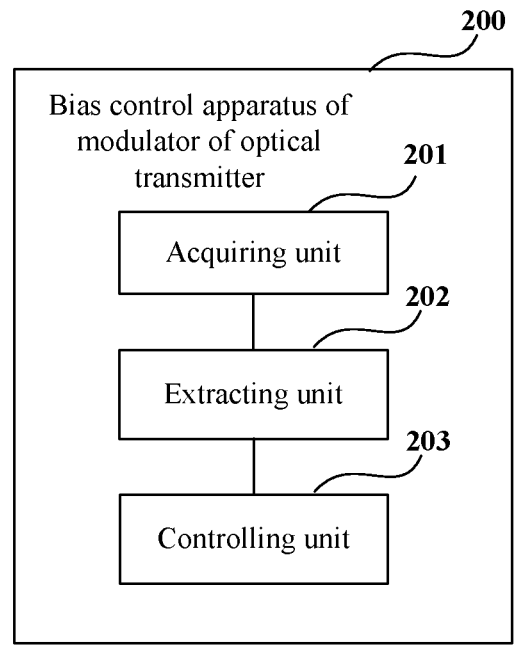
FIG. 2 is a schematic diagram of the bias control apparatus of a modulator of an optical transmitter of Embodiment 1 of this disclosure.

FIG. 2 is a schematic diagram of the bias control apparatus of a modulator of an optical transmitter of Embodiment 1 of this disclosure, the modulator of the optical transmitter including a first Mach-Zehnder modulator and a second Mach-Zehnder modulator. As shown in FIG. 2, the apparatus 200 includes: an acquiring unit 201 configured to obtain a first output power signal of the first Mach-Zehnder modulator, a second output power signal of the second Mach-Zehnder modulator and a third output power signal of the modulator of the optical transmitter; an extracting unit 202 configured to extract information on a phase bias of the modulator of the optical transmitter according to the first output power signal, the second output power signal and the third output power signal; and a controlling unit 203 configured to control the phase bias of the modulator of the optical transmitter according to the information on the phase bias of the modulator of the optical transmitter.

It can be seen from the above embodiment that by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

Figure 1:
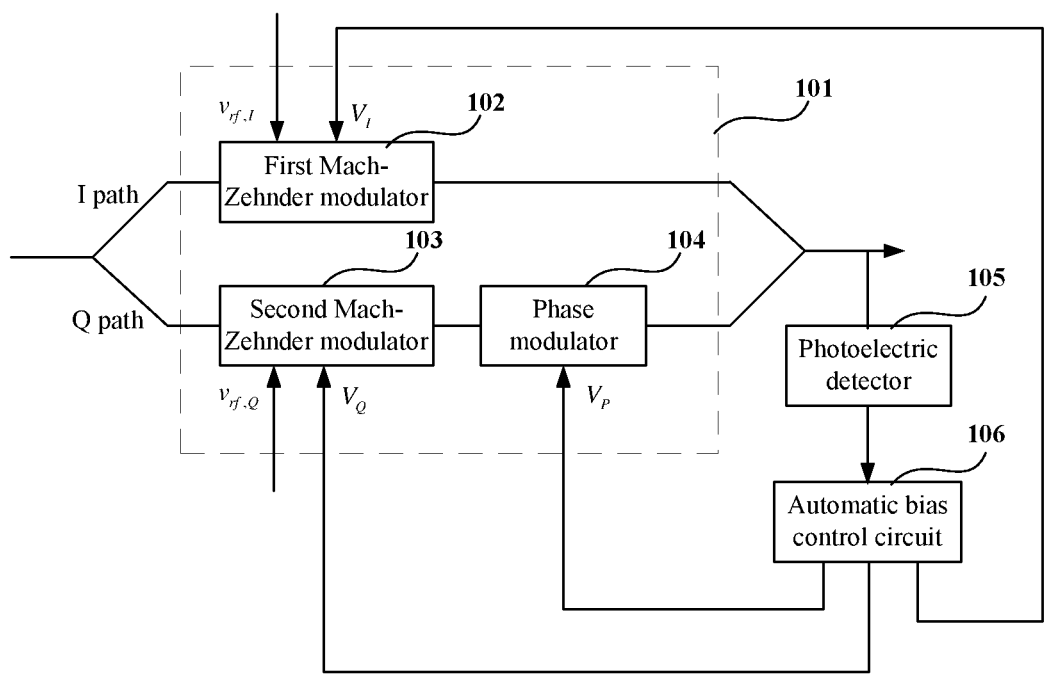
FIG. 1 is a schematic diagram of existing bias control on a modulator of an optical transmitter.

In this embodiment, the modulator of the optical transmitter includes the first Mach-Zehnder modulator and the second Mach-Zehnder modulator. And an existing structure may be used for the modulator of the optical transmitter, for example, a structure identical that of the modulator 101 of the optical transmitter in FIG. 1 may be used.

An output optical field $E_{out}$ of the modulator of the optical transmitter may be expressed as:

$$E_{out} = E_I + j e^{j \Delta \theta_P} E_Q \qquad (1);$$

where, $E_{out}$ denotes the output optical field of the modulator of the optical transmitter, $E_I$ denotes the output optical field of the first Mach-Zehnder modulator, $E_Q$ denotes the output optical field of the second Mach-Zehnder modulator, and $\Delta\theta_P$ denotes an offset of the bias point P on the phase modulator relative to 90°.

A corresponding output power signal may be obtained according to the output optical field of the modulator of the optical transmitter. For example, following formula (2) may be used to express the output power signal:

$$P_{out} = |E_{out}|^2 \quad (2);$$

where, $P_{out}$ denotes the output power signal of the modulator of the optical transmitter, i.e., the third output power signal, and $E_{out}$ denotes the output optical field of the modulator of the optical transmitter.

The output power signal may be expressed by combining the above formulae (1) and (2) according to following formula (3):

$$P_{out} = |E_I|^2 + |E_Q|^2 - 2E_I E_Q \sin(\Delta\theta_P) \quad (3);$$

where, $P_{out}$ denotes the output power signal of the modulator of the optical transmitter, i.e., the third output power signal, $E_I$ denotes the output optical field of the first Mach-Zehnder modulator, $E_Q$ denotes the output optical field of the second Mach-Zehnder modulator, and $\Delta\theta_P$ denotes the offset of the bias point P on the phase modulator relative to 90°, i.e., a drift of the phase bias.

In above formula (3), the former items on the right may respectively be expressed as:

$$P_I = |E_I|^2 \quad (4),$$

$$P_Q = |E_Q|^2 \quad (5);$$

where, $P_I$ denotes the output power signal of the first Mach-Zehnder modulator, i.e., the first output power signal, $E_I$ denotes the output optical field of the first Mach-Zehnder modulator, $P_Q$ denotes the output optical field of the second Mach-Zehnder modulator, i.e., the second output power signal, and $E_Q$ denotes the output optical field of the second Mach-Zehnder modulator.

In above formula (3), the third item on the right may be expressed as:

$$P_{beat} = 2E_I E_Q \sin(\Delta\theta_P) \quad (6);$$

where, $E_I$ denotes the output optical field of the first Mach-Zehnder modulator, $E_Q$ denotes the output optical field of the second Mach-Zehnder modulator, and $\Delta\theta_P$ denotes an offset of the bias point P on the phase modulator relative to 90°, i.e., a drift of the phase bias.

In normal cases, only one photoelectric detector is provided in the optical transmitter, which is used to detect the output power signal $P_{out}$ of the modulator of the optical transmitter, and perform bias control according to a detection result. As what is related to the phase bias is only $P_{beat}$ expressed by formula (6), $P_I$ and $P_Q$ expressed by formulae (4) and (5) will interfere with the bias control.

In this embodiment, the first output power signal $P_I$ of the first Mach-Zehnder modulator, the second output power signal $P_Q$ of the second Mach-Zehnder modulator and the third output power signal $P_{out}$ of the modulator of the optical transmitter may be obtained by the acquiring unit 201, the information on the phase bias of the modulator of the optical transmitter, such as $P_{beat}$, is extracted by the extracting unit 202 according to $P_I$, $P_Q$ and $P_{out}$, and the phase bias of the modulator of the optical transmitter is controlled by the controlling unit 203 according to the extracted $P_{beat}$. Hence, the phase bias may be controlled by directly using the information on the phase bias, and interference from other information may be removed, which may efficiently improve a sensitivity of the control of the bias, and is applicable to various types of modulation formats.

In this embodiment, the acquiring unit 201 is configured to obtain the first output power signal of the first Mach-Zehnder modulator, the second output power signal of the second Mach-Zehnder modulator and the third output power signal of the modulator of the optical transmitter.

For example, other two photoelectric detectors used for detecting the first Mach-Zehnder modulator and the second Mach-Zehnder modulator may be additionally provided in the optical transmitter. That is, the optical transmitter has a first photoelectric detector for detecting first output power of the first Mach-Zehnder modulator, a second photoelectric detector for detecting second output power of the second Mach-Zehnder modulator and a third photoelectric detector for detecting third output power of the modulator of the optical transmitter.

Figure 3:
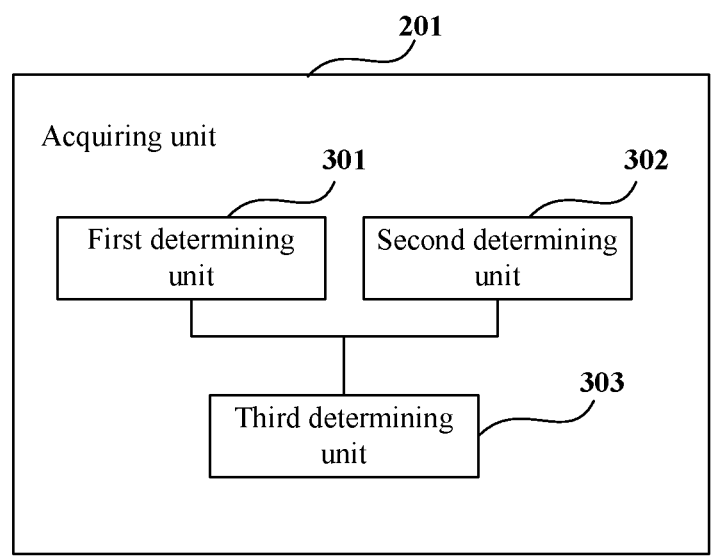
FIG. 3 is a schematic diagram of an acquiring unit 201 of Embodiment 1 of this disclosure.

FIG. 3 is a schematic diagram of the acquiring unit 201 of Embodiment 1 of this disclosure. As shown in FIG. 3, the acquiring unit 201 includes: a first determining unit 301 configured to determine the first output power signal according to a detection result of the first photoelectric detector; a second determining unit 302 configured to determine the second output power signal according to a detection result of the second photoelectric detector; and a third determining unit 303 configured to determine the third output power signal according to a detection result of the third photoelectric detector.

In this embodiment, the first determining unit 301, the second determining unit 302 and the third determining unit 303 may, for example, determine signals of power varying along with the time, i.e., the first output power signal, the second output power signal and the third output power signal, according to power values detected by the first photoelectric detector, the second photoelectric detector and the third photoelectric detector.

In this embodiment, the photoelectric detectors may use existing structures. For example, the photoelectric detector may be photodiodes.

Figure 4:
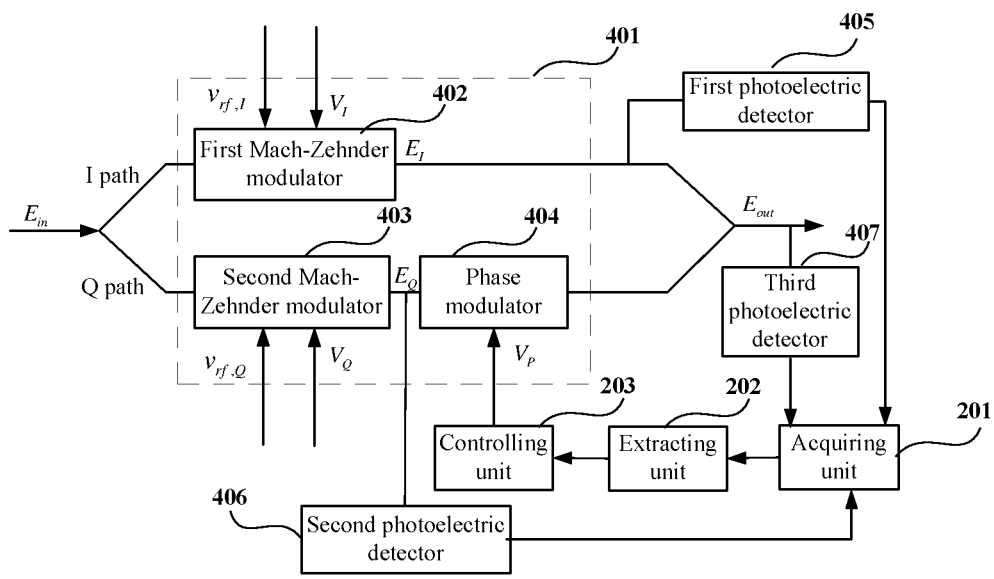
FIG. 4 is a schematic diagram of performing bias control on the modulator of the optical transmitter of Embodiment 1 of this disclosure.

FIG. 4 is a schematic diagram of performing bias control on the modulator of the optical transmitter of Embodiment 1 of this disclosure. As shown in FIG. 4, the modulator 401 of the optical transmitter includes a first Mach-Zehnder modulator 402, a second Mach-Zehnder modulator 403, and a phase modulator 404. The first Mach-Zehnder modulator 402 is used to modulate transmitted signals of an I path, the second Mach-Zehnder modulator 403 is used to modulate transmitted signals of a Q path, a first driving signal $v_{rf,I}$ and a second driving signal $v_{rf,Q}$ being respectively used for driving the first Mach-Zehnder modulator 402 and the second Mach-Zehnder modulator 403, and the phase modulator 404 introduces a phase difference of 90° between the I path and the Q path. The first photoelectric detector 405 detects the first output power of the first Mach-Zehnder modulator 402, the second photoelectric detector 406 detects the second output power of the second Mach-Zehnder modulator 403, and the third photoelectric detector 407 detects the third output power of the modulator 401 of the optical transmitter. Furthermore, as the extracting unit 202 may further adjust a proportion of a combination of the I path and the Q path, the second photoelectric detector 406 may detect output power of an optical signal after passing the phase modulator 404 alternatively.

The acquiring unit 201 determines the first output power signal of the first Mach-Zehnder modulator 402, the second output power signal of the second Mach-Zehnder modulator 403 and the third output power signal of the modulator 401 of the optical transmitter according to the detection results of the first photoelectric detector 405, the second photoelectric detector 406 and the third photoelectric detector 407. The extracting unit 202 extracts the information on the phase bias of the modulator 401 of the optical transmitter according to the first output power signal, the second output power signal and the third output power signal. And the controlling unit 203 controls the phase bias of the modulator 401 of the optical transmitter according to the information on the phase bias of the modulator 401 of the optical transmitter, that is, controls a bias voltage $V_P$ on a bias point P on the phase modulator 404. The relevant art may be used for controlling bias voltages $V_I$ and $V_Q$.

In this embodiment, the extracting unit 202 extracts the information on the phase bias of the modulator 401 of the optical transmitter according to the first output power signal, the second output power signal and the third output power signal. For example, $P_{beat}$ expressed by the above formula (6) is extracted.

For example, according to the above formulae (3)-(6), $P_{beat}$ may be obtained based on the following formula (7):

$$P_{beat} = P_{out} - P_I - P_Q \qquad (7);$$

where, $P_{out}$ denotes the output power signal of the modulator of the optical transmitter, i.e., the third output power signal, $P_I$ denotes the output power signal of the first Mach-Zehnder modulator, i.e., the first output power signal, and $P_Q$ denotes the output power signal of the second Mach-Zehnder modulator second, i.e., the second output power signal.

As in a practical optical transmitter, there may possibly exist imbalance between output of the I path where the first Mach-Zehnder modulator is located and output of the Q path where the second Mach-Zehnder modulator is located in being combined into overall output of the modulator of the optical transmitter and there may possibly exist relative delay between the output power signal of the I path where the first Mach-Zehnder modulator is located, the output power signal of the Q path where the second Mach-Zehnder modulator is located and the overall output power signal of the modulator of the optical transmitter, there exists deviations between the first output power signal and the second output power signal actually obtained by the acquiring unit 201 and theoretical values in the above formula (7), which need to be adjusted. A structure of the extracting unit 202 and a method for extracting shall be illustrated below.

Figure 5:
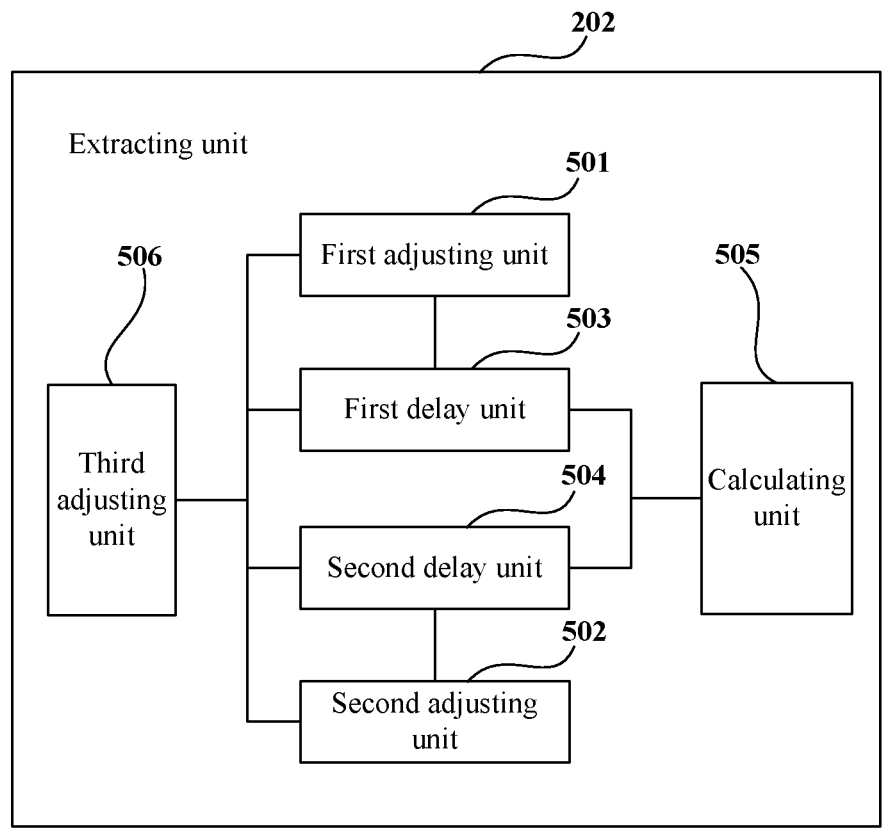
FIG. 5 is a schematic diagram of an extracting unit 202 of Embodiment 1 of this disclosure.

FIG. 5 is a schematic diagram of the extracting unit 202 of Embodiment 1 of this disclosure. As shown in FIG. 5, the extracting unit 202 includes: a first adjusting unit 501 configured to perform first power adjustment on the first output power signal; a second adjusting unit 502 configured to perform second power adjustment on the second output power signal; a first delay unit 503 configured to perform first delay processing on the first output power signal after being performed the first power adjustment; a second delay unit 504 configured to perform second delay processing on the second output power signal after being performed the second power adjustment; and a calculating unit 505 configured to subtract the third output power signal by the first output power signal after being performed the first power adjustment and the first delay processing and the second output power signal after being performed the second power adjustment and the second delay processing, and take a calculating result as the information on the phase bias of the modulator of the optical transmitter.

Hence, by performing adjustment and delay processing on the first output power signal and the second output power signal, combination proportions of the I path and the Q path may be kept consistent, and delay of the output power signal of the I path and output power signal of the Q path relative to the overall output power signal of the modulator may be eliminated, so that the extracted information is more accurate, and the sensitivity of the control of the bias is further improved.

In this embodiment, for example, the first adjusting unit 501 may adjust an amplitude of the first output power signal by using a first adjustment factor, the second adjusting unit 502 may adjust an amplitude of the second output power signal by using a second adjustment factor, the first delay unit 503 may perform first delay processing on the first output power signal after being performed the first power adjustment by using first delay, and the second delay unit 504 may perform second delay processing on the second output power signal after being performed the second power adjustment by using second delay.

Figure 6:
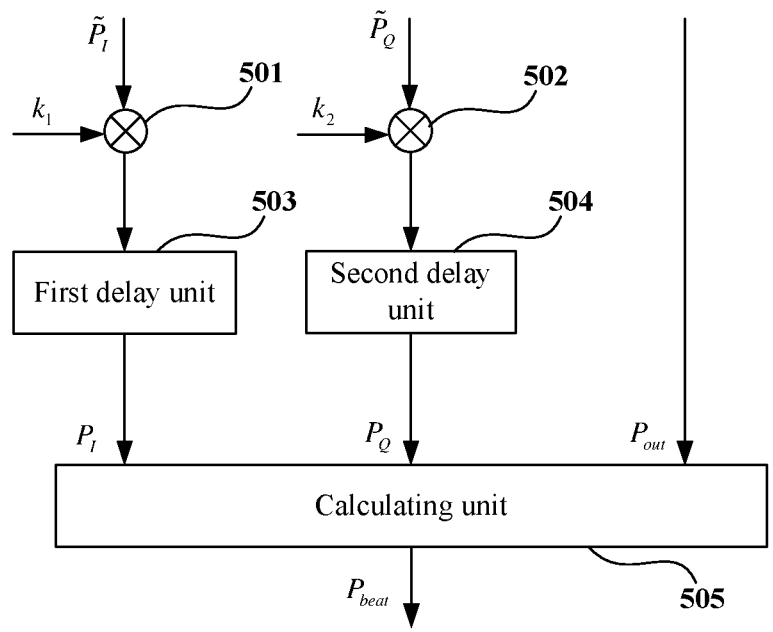
FIG. 6 is a schematic diagram of extracting information on a phase bias of the modulator of the optical transmitter of Embodiment 1 of this disclosure.

FIG. 6 is a schematic diagram of extracting information on a phase bias of the modulator of the optical transmitter of Embodiment 1 of this disclosure. As shown in FIG. 6, the first output power signal and the second output power signal actually obtained by the acquiring unit 201 are respectively expressed as $\tilde{P}_I$ and $\tilde{P}_Q$, the third output power signal obtained by the acquiring unit 201 is expressed as $P_{out}$, the first adjusting unit 501 and the second adjusting unit 502 are, for example, multipliers. The first adjustment factor $k_1$ and the second adjustment factor $k_2$ are respectively multiplied by $\tilde{P}_I$ and $\tilde{P}_Q$, so as to fulfill the first power adjustment and the second power adjustment. The first delay unit 503 and the second delay unit 504=respectively perform delay processing by using the delay $\tau_1$ and $\tau_2$, so as to obtain $P_I$ and $P_Q$. And the calculating unit 505 obtains $P_{beat}$ through calculation according to the above formula (7).

In this embodiment, after the extracting unit 202 extracts the information on the phase bias of the modulator of the optical transmitter, the controlling unit 203 controls the phase bias of the modulator of the optical transmitter according to the information.

In this embodiment, the controlling unit 203 may control the phase bias by using various relevant methods, such as a peak value or mean square value detection method, or a phase synchronization detection method.

In this embodiment, as shown in FIG. 5, the extracting unit 202 may further include: a third adjusting unit 506 configured to adjust at least one of the first adjustment factor used for performing the first power adjustment and the second adjustment factor used for performing the second power adjustment, and at least one of the first delay used for performing the first delay processing and the second delay used for performing the second delay processing according to a sensitivity of the control of the phase bias of the modulator of the optical transmitter by the controlling unit.

Hence, at least one of the first adjustment factor and the second adjustment factor and at least one of the first delay and the second delay are adjusted according to the sensitivity of the control of the phase bias, which may further improve the sensitivity of the control of the bias.

It can be seen from the above embodiment that by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

Embodiment 2

Figure 7:
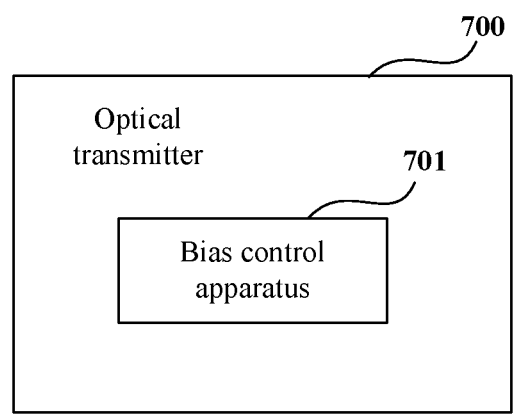
FIG. 7 is a schematic diagram of a structure of the optical transmitter of Embodiment 2 of this disclosure.

The embodiment of this disclosure provides an optical transmitter. FIG. 7 is a schematic diagram of a structure of the optical transmitter of Embodiment 2 of this disclosure. As shown in FIG. 7, the optical transmitter 700 includes a bias control apparatus 701, a structure and functions of which being identical to those described in Embodiment 1, which shall not described herein any further.

Figure 8:
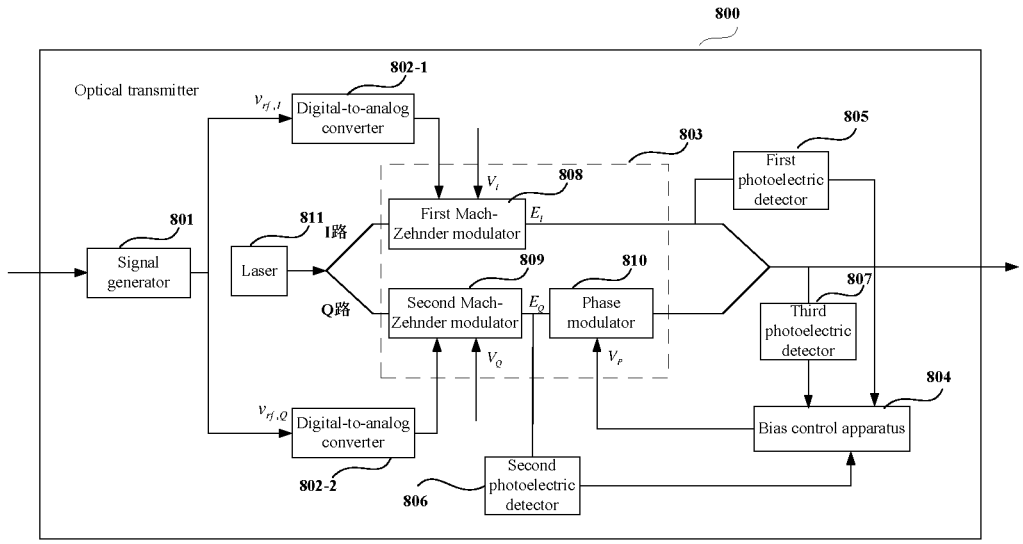
FIG. 8 is a block diagram of a systematic structure of the optical transmitter of Embodiment 2 of this disclosure.

FIG. 8 is a block diagram of a systematic structure of the optical transmitter of Embodiment 2 of this disclosure. As shown in FIG. 8, the optical transmitter 800 includes a signal generator 801, digital-to-analog converters 802-1 and 802-2, a modulator 803, a bias control apparatus 804, a first photoelectric detector 805, a second photoelectric detector 806, and a third photoelectric detector 807, the modulator 803 including a first Mach-Zehnder modulator 808, a second Mach-Zehnder modulator 809 and a phase modulator 810.

Furthermore, the optical transmitter 800 includes a laser 811; wherein, the signal generator 801 generates digital signals of two paths according to transmitted data, and generates driving signals for an I path and a Q path of the modulator 803, i.e., driving signals $V_{rf,I}$ and $V_{rf,Q}$ of the first Mach-Zehnder modulator 808 and the second Mach-Zehnder modulator 809; the digital-to-analog converters 802-1 and 802-2 respectively perform digital-to-analog conversion on the driving signals for the I path and the Q path; the modulator 803 modulates light emitted from the laser 811 according to the driving signals; the first photoelectric detector 805, the second photoelectric detector 806 and the third photoelectric detector 807 respectively detect output power of the first Mach-Zehnder modulator 808, output power of the second Mach-Zehnder modulator 809 and overall output power of the modulator 803; and the bias control apparatus 804 controls phase bias of the modulator 803 according to detection results of the first photoelectric detector 805, the second photoelectric detector 806 and the third photoelectric detector 807, that is, controls a bias voltage $V_P$ on the modulator 803. And the relevant art may be used for controlling bias voltages $V_I$ and $V_Q$.

In this embodiment, the relevant art may be referred to for structures of the signal generator 801, the digital-to-analog converters 802, the modulator 803, the first photoelectric detector 805, the second photoelectric detector 806 and the third photoelectric detector 807, and a structure and functions of the bias control apparatus 804 are identical to those described in Embodiment 1, and shall not be described herein any further. Furthermore, the bias control apparatus 804 may be integrated into a digital signal processor of the optical transmitter, that is, the functions of the bias control apparatus 804 are realized by the digital signal processor. For example, the digital signal processor may be configured to: obtain a first output power signal of the first Mach-Zehnder modulator, a second output power signal of the second Mach-Zehnder modulator and a third output power signal of the modulator of the optical transmitter; extract information on a phase bias of the modulator of the optical transmitter according to the first output power signal, the second output power signal and the third output power signal; and control the phase bias of the modulator of the optical transmitter according to the information on the phase bias of the modulator of the optical transmitter.

In this embodiment, the optical transmitter 800 does not necessarily include all the components shown in FIG. 8. Furthermore, the optical transmitter 800 may include components not shown in FIG. 8, and the relevant art may be referred to.

It can be seen from the above embodiment that by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

Embodiment 3

The embodiment of this disclosure provides a bias control method of a modulator of an optical transmitter, corresponding to the bias control apparatus of a modulator of an optical transmitter in Embodiment 1.

Figure 9:
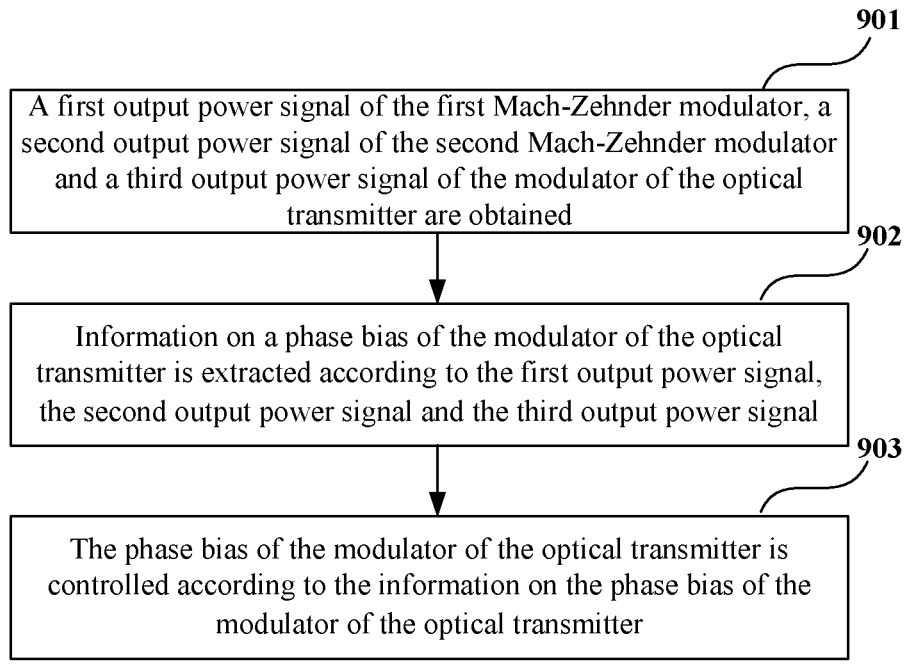
FIG. 9 is a flowchart of the bias control method of a modulator of an optical transmitter of Embodiment 3 of this disclosure.

FIG. 9 is a flowchart of the bias control method of a modulator of an optical transmitter of Embodiment 3 of this disclosure. The modulator of the optical transmitter has a first Mach-Zehnder modulator and a second Mach-Zehnder modulator. As shown in FIG. 9, the method includes:

Step 901: a first output power signal of the first Mach-Zehnder modulator, a second output power signal of the second Mach-Zehnder modulator and a third output power signal of the modulator of the optical transmitter are obtained;

Step 902: information on a phase bias of the modulator of the optical transmitter is extracted according to the first output power signal, the second output power signal and the third output power signal; and Step 903: the phase bias of the modulator of the optical transmitter is controlled according to the information on the phase bias of the modulator of the optical transmitter.

In this embodiment, particular implementation methods of the above steps are identical to those described in Embodiment 1, which shall not be described herein any further.

It can be seen from the above embodiment that by obtaining respective output power signals of a first Mach-Zehnder modulator and a second Mach-Zehnder modulator constituting the modulator of the optical transmitter, information on a phase bias may be extracted according to the two output power signals and an overall output power signal of the modulator of the optical transmitter, so as to control the phase bias by using the information, thereby efficiently improving a sensitivity of the control of the bias, and being applicable to various types of modulation formats.

An embodiment of the present disclosure provides a computer readable program, which, when executed in a bias control apparatus of a modulator of an optical transmitter or an optical transmitter, will cause the computer to carry out the bias control method of a modulator of an optical transmitter as described in Embodiment 3 in the bias control apparatus of a modulator of an optical transmitter or the optical transmitter.

An embodiment of the present disclosure provides a computer storage medium, including a computer readable program, which will cause the computer to carry out the bias control method of a modulator of an optical transmitter as described in Embodiment 3 in a bias control apparatus of a modulator of an optical transmitter or an optical transmitter.

The bias control method carried out in the bias control apparatus of a modulator of an optical transmitter or the optical transmitter described with reference to the embodiments of this disclosure may be directly embodied as hardware, software modules executed by a processor, or a combination thereof. For example, one or more functional block diagrams and/or one or more combinations of the functional block diagrams shown in FIG. 2 may either correspond to software modules of procedures of a computer program, or correspond to hardware modules. Such software modules may respectively correspond to the steps shown in FIG. 9. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 2 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A bias control apparatus to couple to a modulator of an optical transmitter, the modulator of the optical transmitter including a first Mach-Zehnder modulator and a second Mach-Zehnder modulator, the apparatus comprising:
   at least one memory to store instructions and information; and
   at least one hardware processor to perform, the at least one hardware processor coupled to the at least one memory to execute the instructions to perform, and/or the at least one hardware processor is to perform,
   obtain a first output power signal of the first Mach-Zehnder modulator, a second output power signal of the second Mach-Zehnder modulator, and a third output power signal of the modulator of the optical transmitter;
   extract information on a phase bias of the modulator of the optical transmitter, according to the first output power signal, the second output power signal, and the third output power signal; and
   control the phase bias of the modulator of the optical transmitter, according to the extracted information on the phase bias of the modulator of the optical transmitter,
   wherein the at least one hardware processor is to:
      perform a first power adjustment on the first output power signal;
      perform a second power adjustment on the second output power signal;
      perform a first delay processing on the first output power signal after being performed the first power adjustment;
      perform a second delay processing on the second output power signal after being performed the second power adjustment; and
      to extract the information on the phase bias of the modulator of the optical transmitter,
         subtract the third output power signal by the first output power signal after being performed the first power adjustment and the first delay processing, and
         subtract the second output power signal after being performed the second power adjustment and the second delay processing.

2. The apparatus according to claim 1, wherein the at least one hardware processor is to:
   in response to a sensitivity of the control of the phase bias of the modulator of the optical transmitter,
   adjust any one or combination of,
      a first adjustment factor used for performing the first power adjustment,
      a second adjustment factor used for performing the second power adjustment,
      a first delay used for performing the first delay processing, or
      a second delay used for performing the second delay processing.

3. The apparatus according to claim 1, wherein the optical transmitter includes:
   a first photoelectric detector to detect a first output power of the first Mach-Zehnder modulator,
   a second photoelectric detector to detect a second output power of the second Mach-Zehnder modulator, and
   a third photoelectric detector to detect a third output power of the modulator of the optical transmitter,
   the at least one hardware processor is to,
      determine the first output power signal according to a detection result of the first photoelectric detector;
      determine the second output power signal according to a detection result of the second photoelectric detector; and
      determine the third output power signal according to a detection result of the third photoelectric detector.

4. An optical transmitter, comprising the apparatus as claimed in claim 1.

5. The optical transmitter according to claim 1, wherein the optical transmitter includes,
   a first photoelectric detector for detecting first output power of the first Mach-Zehnder modulator, a second photoelectric detector for detecting second output power of the second Mach-Zehnder modulator, and
a third photoelectric detector for detecting third output power of the modulator of the optical transmitter,
the at least one hardware processor is to,
determine the first output power signal according to a detection result of the first photoelectric detector;
determine the second output power signal according to a detection result of the second photoelectric detector; and
determine the third output power signal according to a detection result of the third photoelectric detector.

6. A method of controlling a bias of a modulator of an optical transmitter, the modulator of the optical transmitter including a first Mach-Zehnder modulator and a second Mach-Zehnder modulator, the method comprising:
obtaining a first output power signal of the first Mach-Zehnder modulator, a second output power signal of the second Mach-Zehnder modulator, and a third output power signal of the modulator of the optical transmitter;
extracting information on a phase bias of the modulator of the optical transmitter according to the first output power signal, the second output power signal, and the third output power signal; and
controlling the phase bias of the modulator of the optical transmitter according to the extracted information on the phase bias of the modulator of the optical transmitter,
wherein the extracting information on the phase bias includes,
performing a first power adjustment on the first output power signal;
performing a second power adjustment on the second output power signal;
performing a first delay processing on the first output power signal after being performed the first power adjustment;
performing a second delay processing on the second output power signal after being performed the second power adjustment; and
to obtain the extracted information on the phase bias,
subtracting the third output power signal by the first output power signal after being performed the first power adjustment and the first delay processing, and
subtracting the second output power signal after being performed the second power adjustment and the second delay processing.

7. The method according to claim 6, wherein the method further comprises:
in response to a sensitivity of the controlling the phase bias of the modulator of the optical transmitter, adjusting any one or combination of,
a first adjustment factor used for performing the first power adjustment, and
a second adjustment factor used for performing the second power adjustment,
a first delay used for performing the first delay processing, or
a second delay used for performing the second delay processing.

8. The method according to claim 6, wherein the optical transmitter includes,
a first photoelectric detector to detect a first output power of the first Mach-Zehnder modulator,
a second photoelectric detector to detect a second output power of the second Mach-Zehnder modulator, and
a third photoelectric detector to detect a third output power of the modulator of the optical transmitter,
the obtaining a first output power signal of the first Mach-Zehnder modulator, a second output power signal of the second Mach-Zehnder modulator and a third output power signal of the modulator of the optical transmitter, includes,
determining the first output power signal according to a detection result of the first photoelectric detector;
determining the second output power signal according to a detection result of the second photoelectric detector; and
determining the third output power signal according to a detection result of the third photoelectric detector.

* * * * *